United States Patent
Zhang (10) Patent No.: US 10,643,069 B2
(45) Date of Patent: May 5, 2020

(54) IRIS RECOGNITION METHOD, ELECTRONIC DEVICE AND COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 67 days.

(21) Appl. No.: 15/968,070

(22) Filed: May 1, 2018

(65) Prior Publication Data

US 2018/0365494 A1    Dec. 20, 2018

(30) Foreign Application Priority Data

Jun. 16, 2017    (CN) .......................... 2017 1 0456924

(51) Int. Cl.
    *G06K 9/00*      (2006.01)
    *G06K 9/22*      (2006.01)
    (Continued)

(52) U.S. Cl.
    CPC ..... *G06K 9/00617* (2013.01); *G06K 9/00355* (2013.01); *G06K 9/00604* (2013.01);
    (Continued)

(58) Field of Classification Search
None
See application file for complete search history.

(56) References Cited

U.S. PATENT DOCUMENTS 6,419,638 B1 *   7/2002   Hay ..................... A61B 3/0025
                                                        600/558
9,119,068 B1 *   8/2015   Hubble ................. H04W 12/06
(Continued)

FOREIGN PATENT DOCUMENTS

CN        105095847 A     11/2015
CN        105760739 A      7/2016
(Continued)

OTHER PUBLICATIONS

Lili, Pan, and Xie Mei. "The algorithm of iris image preprocessing." Fourth IEEE Workshop on Automatic Identification Advanced Technologies (AutoID'05). IEEE, 2005. (Year: 2005).*

(Continued)

*Primary Examiner* — Kim Y Vu
*Assistant Examiner* — Nathan J Bloom
(74) *Attorney, Agent, or Firm* — Lathrop GPM LLP (57) ABSTRACT

Embodiments of the present disclosure provide an iris recognition method applied for an electronic device. The electronic device includes an iris recognition module and a motion sensor. The iris recognition module includes an infrared camera. The method includes: detecting motion information of the electronic device by the motion sensor; when the motion information of the electronic device satisfies a preset condition, capturing an image of a user by the infrared camera; and when determining that there is a face contour in the image, performing iris recognition by the iris recognition module. Further, embodiments of the present disclosure provide an electronic device and a computer-readable storage medium.

20 Claims, 5 Drawing Sheets

(51) Int. Cl.
  *G06K 9/20* (2006.01)
  *G06K 9/46* (2006.01)
  *G06T 7/20* (2017.01)

(52) U.S. Cl.
  CPC ............. *G06K 9/2027* (2013.01); *G06K 9/22* (2013.01); *G06K 9/4633* (2013.01); *G06T 7/20* (2013.01); *G06T 2207/10048* (2013.01); *G06T 2207/30201* (2013.01)

(56) References Cited

U.S. PATENT DOCUMENTS

| | | | |
|---|---|---|---|
| 2007/0140531 A1* | 6/2007 | Hamza | G06K 9/00597 382/117 |
| 2008/0037835 A1* | 2/2008 | Lee | G06K 9/00604 382/117 |
| 2008/0095411 A1* | 4/2008 | Hwang | G06K 9/0061 382/117 |
| 2010/0049468 A1 | 2/2010 | Papadourakis | |
| 2010/0246847 A1* | 9/2010 | Johnson, Jr. | H04R 1/1041 381/74 |
| 2013/0063611 A1 | 3/2013 | Kim et al. | |
| 2015/0098630 A1 | 4/2015 | Perna et al. | |
| 2015/0105759 A1* | 4/2015 | Morley | A61F 9/008 606/4 |
| 2016/0012218 A1 | 1/2016 | Perna et al. | |
| 2016/0125221 A1 | 5/2016 | Kim et al. | |
| 2016/0364609 A1* | 12/2016 | Ivanisov | G06K 9/00604 |
| 2017/0140644 A1* | 5/2017 | Hwang | G08C 17/02 |

FOREIGN PATENT DOCUMENTS

| | | |
|---|---|---|
| CN | 105892619 A | 8/2016 |
| CN | 106569685 A | 4/2017 |
| CN | 106845200 A | 6/2017 |
| CN | 107368725 A | 11/2017 |
| WO | WO 2010045498 A1 | 4/2010 |

OTHER PUBLICATIONS

European Patent Application No. 18165885.7, extended Search and Opinion dated Oct. 30, 2018, 8 pages.
Chinese Patent Application No. 201710456924.6, Office Action dated Apr. 12, 2019, 7 pages.
Chinese Patent Application No. 201710456924.6, English translation of Office Action dated Apr. 12, 2019, 8 pages.
PCT/CN2018/081433 English Translation of the International Search Report and Written Opinion dated May 31, 2018, 10 pp.
European Patent Application No. 18165885.7, Extended Search and Opinion dated Aug. 30, 2019, 6 pages.
Bowyer et al. (2008) "Image understanding for iris biometrics: A survey," Computer Vision and Image Understanding, 110, pp. 281-307.
Singapore Patent Application No. 11201905971X, Search Report and Written Opinion dated Mar. 9, 2020, 8 pages.
Avci, A. et al. "Activity Recognition Using Inertial Sensing for Healthcare, Wellbeing and Sports Applications: A Survey", 23th International Conference on Architecture of Computing Systems, ARCS 2010, Feb. 23, 2010, 10 pages.
European Patent Application No. 18165885.7, summons to attend Oral Proceedings dated Feb. 26, 2020, 10 pages.

* cited by examiner

IRIS RECOGNITION METHOD, ELECTRONIC DEVICE AND COMPUTER-READABLE STORAGE MEDIUM

CROSS REFERENCE TO RELATED APPLICATION

This application is based upon and claims priority to Chinese Patent Application Serial No. 201710456924.6, filed with the Status Intellectual Property Office of P. R. China on Jun. 16, 2017, the entire contents of which are incorporated herein by reference.

FIELD

The present disclosure relates to a field of biometric identification technologies, and more particularly to an iris recognition method, an electronic device and a computer-readable storage medium.

BACKGROUND

In related arts, iris recognition technologies configured for unlocking mobile phones have a slow startup speed and poor user experience.

SUMMARY

An iris recognition method of embodiments of the present disclosure may be applied for an electronic device. The electronic device includes an iris recognition module and a motion sensor. The iris recognition module includes an infrared camera. The iris recognition method includes: detecting motion information of the electronic device by the motion sensor; when the motion information of the electronic device satisfies a preset condition, capturing an image of a user by the infrared camera; and when determining that there is a face contour in the image, performing iris recognition by the iris recognition module.

An electronic device of embodiments of the present disclosure includes a motion sensor, an infrared camera and an iris recognition module. The iris recognition module includes the infrared camera. The motion sensor is configured to detect motion information of the electronic device. The infrared camera is configured to, when the motion information of the electronic device satisfies a preset condition, capture an image of a user. The iris recognition module is configured to, when it is determined that there is a face contour in the image, perform iris recognition.

A computer-readable storage medium of the embodiments of the present disclosure includes computer programs configured to combine with an electronic device capable of photographing. The computer programs are configured be executed by a processor to perform the above iris recognition method.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the embodiments of the present disclosure will become apparent and more readily appreciated from the following descriptions made with reference to the drawings, in which.

DETAILED DESCRIPTION

Embodiments of the present disclosure will be described in detail and examples of the embodiments are illustrated in the drawings. The same or similar elements and the elements having same or similar functions are denoted by like reference numerals throughout the descriptions. The embodiments described herein with reference to the drawings are explanatory, serve to explain the present disclosure, and are not construed to limit the embodiments of the present disclosure.

The present disclosure relates to an iris recognition method. The iris recognition method may be applied for an electronic device. The electronic device includes an iris recognition module and a motion sensor. The iris recognition module includes an infrared camera. The method includes: detecting motion information of the electronic device by the motion sensor; when the motion information of the electronic device satisfies a preset condition, capturing an image of a user by the infrared camera; and when determining that there is a face contour in the image, performing iris recognition by the iris recognition module.

The present disclosure relates to an electronic device. The electronic device includes a motion sensor, an infrared camera and an iris recognition module. The motion sensor is configured to detect motion information of the electronic device. The infrared camera is configured to, when the motion information of the electronic device satisfies a preset condition, capture an image of a user. The iris recognition module includes the infrared camera and is configured to, when it is determined that there is a face contour in the image, perform iris recognition.

The present disclosure relates to another electronic device. The electronic device includes an iris recognition module, a motion sensor, one or more processors, a memory and one or more programs. The iris recognition module includes an infrared camera. The one or more programs have been stored in the memory. The one or more programs are configured to be executed by the one or more processors. The one or more programs include instructions for performing the above iris recognition method.

The present disclosure relates to a computer-readable storage medium. The computer-readable storage medium includes computer programs configured to combine with an electronic device capable of photographing. The computer programs are configured be executed by a processor to perform the above iris recognition method.

Figure 1:
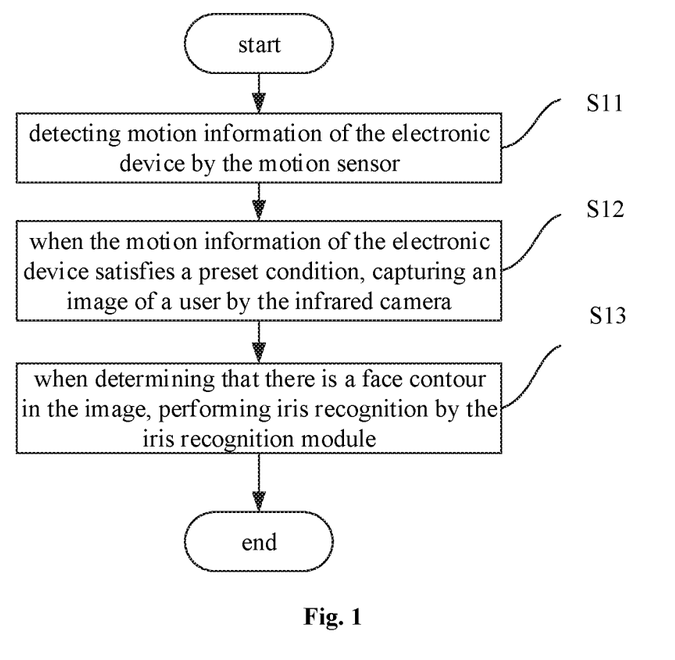
FIG. 1 is a flow chart illustrating an iris recognition method according to some embodiments of the present disclosure.
Figure 2:
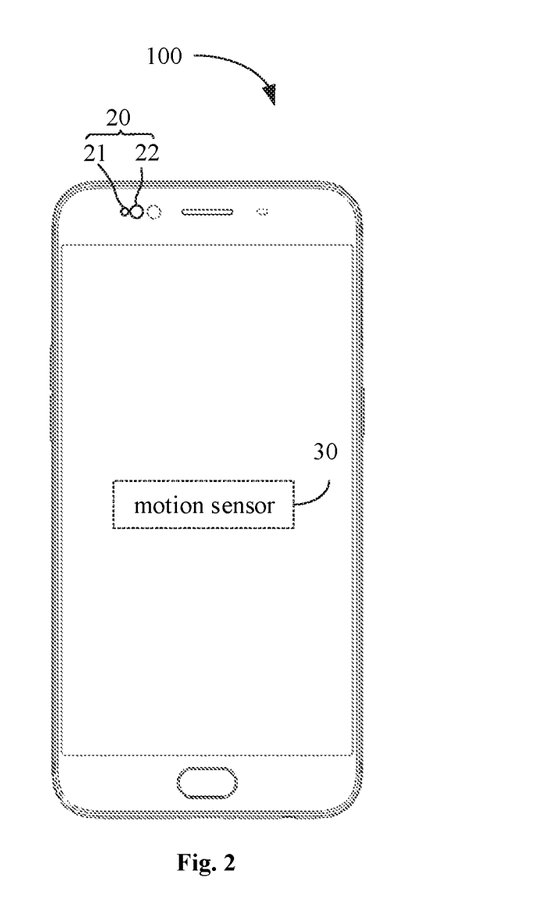
FIG. 2 is a block diagram illustrating an electronic device according to some embodiments of the present disclosure.

An iris recognition method according to embodiments of the present disclosure as illustrated in FIG. 1 may be applied for an electronic device 100 as illustrated in FIG. 2. The electronic device 100 may include an iris recognition module 20 and a motion sensor 30. The iris recognition module 20 may include an infrared camera 22. The iris recognition method may include the following acts.

S11, motion information of the electronic device 100 is detected by the motion sensor 30.

S12, when the motion information of the electronic device 100 satisfies a preset condition, an image of a user is captured by the infrared camera 22.

S13, when determining that there is a face contour in the image, iris recognition is performed by the iris recognition module 20.

In some embodiments, the iris recognition method according to embodiments of the present disclosure as illustrated in FIG. 1 may be implemented by an electronic device 100 according to embodiments of the present disclosure as illustrated in FIG. 2. The electronic device 100 according to embodiments of the present disclosure may include a motion sensor 30, an infrared camera 22 and an iris recognition module 20. The iris recognition module 20 may include an infrared camera 22. Act S11 may be implemented by the motion sensor 30. Act S12 may be implemented by the infrared camera 22. Act S13 may be implemented by the iris recognition module 20.

That is, the motion sensor 30 may be configured to detect the motion information of the electronic device 100. The infrared camera 22 may be configured to, when the motion information of the electronic device 100 satisfies a preset condition, capture an image of a user. The iris recognition module 20 may be configured to, when it is determined that there is a face contour in the image, perform iris recognition.

In some embodiments, the electronic device 100 may include a mobile phone, a tablet, a laptop, a smart watch, a smart wristband, smart glasses, a smart helmet, and the like. In specific embodiments of the present disclosure, the electronic device 100 may be the mobile phone.

Figure 3:
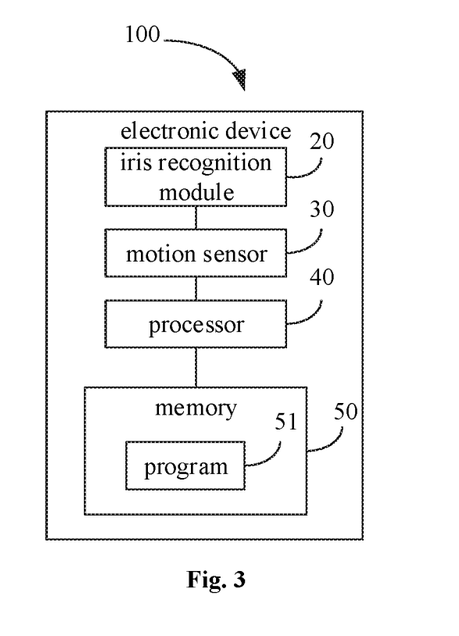
FIG. 3 is a block diagram illustrating an electronic device according to some embodiments of the present disclosure.

As illustrated in FIG. 3, in some embodiments, another electronic device 100 may include an iris recognition module 20, a motion sensor 30, one or more processors 40, a memory 50 and one or more programs 51. The iris recognition module 20 may include an infrared camera 22. The one or more programs 51 have been stored in the memory 50. The one or more programs 51 are configured to be executed by the one or more processors 40. The one or more programs 51 may include instructions for performing the following acts.

S11, motion information of the electronic device 100 is detected by the motion sensor 30.

S12, when the motion information of the electronic device 100 satisfies a preset condition, an image of a user is captured by the infrared camera 22.

S13, when determining that there is a face contour in the image, iris recognition is performed by the iris recognition module 20.

It should be understood that, when the electronic device 100 adopting the iris recognition technology in related arts performs the iris recognition for unlocking or other operations, a power button needs to be pressed to start the iris recognition module 20 for the iris recognition, resulting in a longer unlocking process and poor user experience. With the iris recognition method of the embodiments of the present disclosure, the motion of the electronic device 100 is detected by the motion sensor 30 to trigger the infrared camera 22 to start, and the iris recognition module 20 is quickly started to perform the iris recognition when the infrared camera 22 captures the face contour of the user, thereby reducing a waiting time period for starting the iris recognition and improving the user experience.

In some embodiments, the motion sensor 30 includes a gyroscope and/or an acceleration sensor.

In some embodiments, the gyroscope, adopted in the electronic device 100 (e.g. the mobile phone) according to the embodiments of the present disclosure, may be a MEMS (Micro-Electro-Mechanical-System) gyroscope. The MEMS gyroscope detects an angular speed of the mobile phone by detecting a Coriolis force (i.e., an inertial force that acts on objects that are in motion relative to a rotating reference frame). When the mobile phone is in motion relative to the rotating reference frame, i.e., in radial motion, a lateral capacitive plate in the MEMS gyroscope measures a capacitance change due to a lateral Coriolis force. Since the Coriolis force is proportional to the angular speed, the angular speed may be calculated based on the capacitance change. The MEMS gyroscope may measure angular speeds in three axes of X, Y, and Z, respectively. A speed of the X-axis represents the movement of the mobile phone in the horizontal direction. A speed of the Y-axis represents the movement of the mobile phone in the vertical direction. A speed of the Z-axis represents the movement of the mobile phone in the spatial vertical direction. The MEMS gyroscope may measure the angular speeds of the mobile phone in the three axes of X, Y, and Z to determine the motion information of the mobile phone, for example, whether the mobile phone is lifted by the user, etc., thereby triggering the infrared camera 22 to start to capture the image of the user.

In some embodiments, the acceleration sensor in the embodiments of the present disclosure may be a MEMS acceleration sensor. The MEMS acceleration sensor includes a piezo-resistive micro accelerometer, a capacitive micro accelerometer, a pendulum micro accelerometer and a tunnel micro accelerometer. In a specific embodiment of the present disclosure, the capacitive micro accelerometer may be used to measure an acceleration. In detail, the capacitive micro accelerometer includes two capacitive plates with cantilever structures. When the mobile phone is in motion, a rate of change of speed, i.e., the acceleration, of the mobile phone reaches large enough, an inertial force of the capacitive plates in the capacitive micro accelerometer exceeds an force that fixes or supports the capacitive plates, and the capacitive plates may move, and a distance between the upper and lower capacitive plates changes to change a capacitance value. The change in capacitance is converted by a wafer to a voltage signal, and the acceleration may be calculated based on the voltage signal. The change in capacitance is proportional to the acceleration. In this way, when the mobile phone is in motion, the acceleration of the mobile phone may be measured by the acceleration sensor, and the movement information of the mobile phone is determined based on the acceleration. When the movement information satisfies the preset condition, the infrared camera 22 is triggered to start to capture the image of the user.

Figure 4:
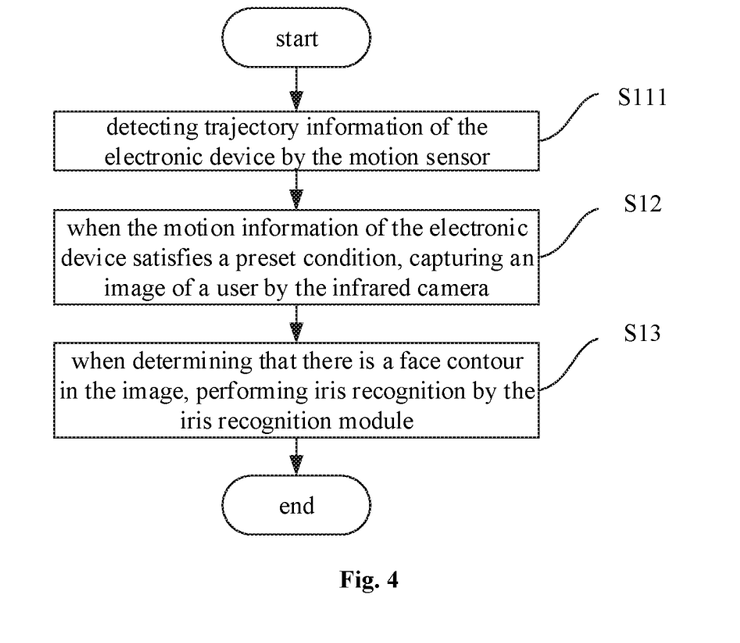
FIG. 4 is a flow chart illustrating an iris recognition method according to some embodiments of the present disclosure.

In some embodiments, the motion information may include trajectory information of the electronic device 100. Detecting the motion information of the electronic device 100 by the motion sensor 30 may include the following acts, as illustrated in FIG. 4.

S111, the trajectory information of the electronic device 100 is detected by the motion sensor 30.

As illustrated in FIG. 2 again, in some embodiments, act S111 may be implemented by the motion sensor 30.

That is, the motion sensor 30 is configured to detect the trajectory information of the electronic device 100.

As illustrated in FIG. 3 again, in some embodiments, the one or programs 51 further include instructions for performing the following acts.

S111, the trajectory information of the electronic device 100 is detected by the motion sensor 30.

The motion sensor 30 may detect acceleration data when the electronic device 100 is in motion while the motion sensor 30 includes the acceleration sensor. Based on the acceleration data detected by the motion sensor 30, a motion trajectory of the electronic device 100 may be calculated. In detail, based on the Newtonian mechanics law of motion, a motion displacement of a moving object may be obtained by double integration on the acceleration of the moving object. Instantaneous movement speeds v of the electronic device 100 in the X, Y, and Z axes in space respectively represents as follows.

$$\vec{v}_x(t) = \vec{v}_x(t - \Delta t) + \frac{\vec{a}_x(t) + \vec{a}_x(t - \Delta t)}{2} \Delta t,$$

$$\vec{v}_y(t) = \vec{v}_y(t - \Delta t) + \frac{\vec{a}_y(t) + \vec{a}_y(t - \Delta t)}{2} \Delta t, \text{ and}$$

$$\vec{v}_z(t) = \vec{v}_z(t - \Delta t) + \frac{\vec{a}_z(t) + \vec{a}_z(t - \Delta t)}{2} \Delta t.$$

At time t, movement displacements s of the electronic device 100 along the X, Y, and Z axes respectively represents as follows:

$$s_x(t)=s_x(t-\Delta t)+v_x(t-\Delta t)\cdot\Delta t+\frac{1}{4}[a_x(t-\Delta t)+a_x(t)]\cdot\Delta t^2,$$

$$s_y(t)=s_y(t-\Delta t)+v_y(t-\Delta t)\cdot\Delta t+\frac{1}{4}[a_y(t-\Delta t)+a_y(t)]\cdot\Delta t^2, \text{ and}$$

$$s_z(t)=s_z(t-\Delta t)+v_z(t-\Delta t)\cdot\Delta t+\frac{1}{4}[a_z(t-\Delta t)+a_z(t)]\cdot\Delta t^2.$$

During a time period of t−Δt, a spatial motion displacement of the electronic device 100 represents as follows:

$$s_\Delta(t) = \sqrt{[s_x(t) - s_x(t-\Delta t)^2] + [s_y(t) - s_y(t-\Delta t)^2] + [s_y(t) - s_y(t-\Delta t)^2]}.$$

In this way, at time t, a space coordinate of the electronic device 100 in the space coordinate system X-Y-Z represents as $(s_x(t), s_y(t), s_z(t))$. Therefore, the motion trajectory of the electronic device 100 may be obtained through all spatial position coordinate points at time $t_0, t_1, t_2, K K t_n$.

The present condition refers to a present motion trajectory that triggers the infrared camera 22 to start. Actually, if a difference between the motion trajectory detected by the motion sensor 30 and the present motion trajectory is smaller than a preset value, the infrared camera 22 may be triggered to start. The preset motion trajectory may be arc-shaped, circular, V-shaped, and the like. In a specific embodiment of the present disclosure, the preset motion trajectory may be arc-shaped. It should be understood that when the user picks up the mobile phone, the mobile phone moves from a position away from the user's face to a position close to the user's face, and the motion trajectory of the mobile phone is usually arc-shaped during this time period. In this way, setting the preset motion trajectory to be arc-shaped may quickly start the infrared camera 22 when the user uses the mobile phone, thereby reducing the waiting time period of the user and improving the user experience.

In some cases, the user holds the mobile phone while walking. At this time, since the swing of the user's arm may cause the motion trajectory of the mobile phone to also be arc-shaped. The image of the user may be captured by the infrared camera 22 and be processed to determine whether there is the face contour in the image of the user. The iris recognition may be performed only when there is the face contour. In this way, false triggering of the iris recognition may be prevented.

Figure 5:
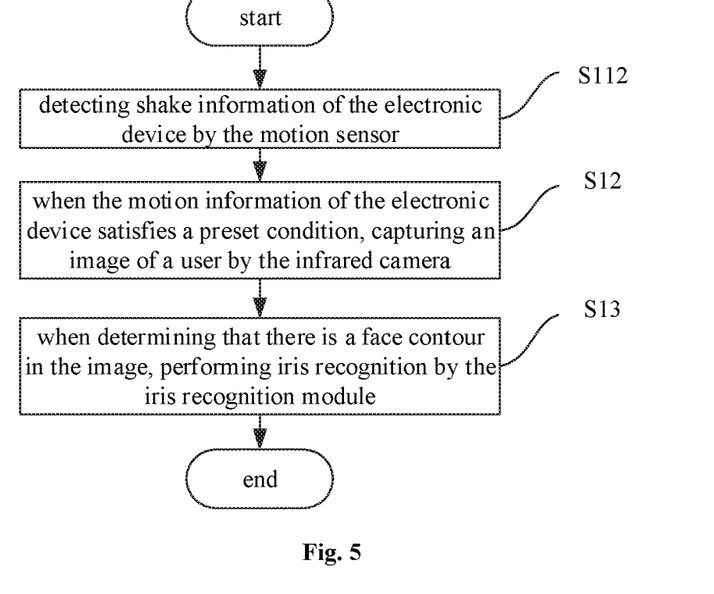
FIG. 5 is a flow chart illustrating an iris recognition method according to some embodiments of the present disclosure.

In some embodiments, the motion information may include shake information of the electronic device 100. Detecting the motion information of the electronic device 100 by the motion sensor 30 may include the following acts, as illustrated in FIG. 5.

S112, the shake information of the electronic device 100 is detected by the motion sensor 30.

As illustrated in FIG. 2 again, in some embodiments, act S112 may be implemented by the motion sensor 30.

That is, the motion sensor 30 is configured to detect the shake information of the electronic device 100.

As illustrated in FIG. 3 again, in some embodiments, the one or programs 51 further include instructions for performing the following acts.

S112, the shake information of the electronic device 100 is detected by the motion sensor 30.

The motion sensor 30 may detect acceleration data when the electronic device 100 is in motion while the motion sensor 30 includes the acceleration sensor. Based on a difference between the acceleration data detected by the motion sensor 30 at two adjacent times, the shake information of the electronic device 100 may be calculated. In detail, the acceleration of the motion sensor 30 may be acquired at different times and the times are recorded correspondingly. Subsequently, a time difference between the adjacent first acceleration and second acceleration is calculated, and absolute values of change of acceleration between the first acceleration and the second acceleration on the X, Y, Z axes of the electronic device 100 are calculated. Then an average value of the rate of change of acceleration based on the time difference and the absolute values by a formula of $$avg = \frac{(\text{delta}_x + \text{delta}_y + \text{delta}_y) \cdot C}{\text{diff}},$$

where avg represents the average value of the rate of change of acceleration, $\text{delta}_x$, $\text{delta}_y$ and $\text{delta}_z$ correspondingly represents the absolute values of change of acceleration on the X, Y, Z axes of the electronic device 100, diff represents the time difference between the adjacent first acceleration and second acceleration, and C represents an amplification factor. The average value avg is compared with a preset average threshold. It is determined that a sudden acceleration change occurs when the average value avg is larger than the preset average threshold. The number of sudden acceleration changes is counted for a time period. When the number is greater than the preset number of shakes, it is determined that the motion information of the electronic device 100 satisfies the preset condition. The preset condition is the preset number of shakes.

Figure 6:
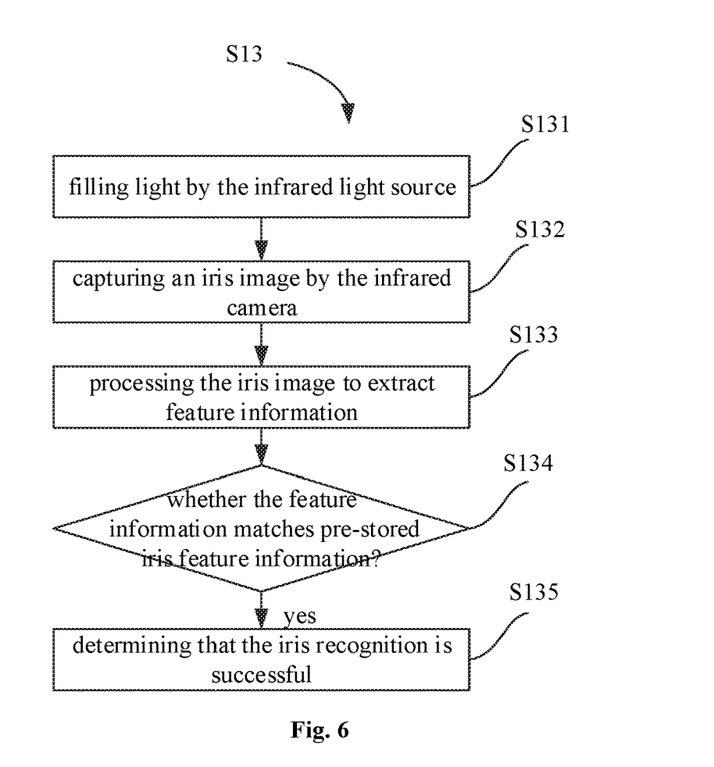
FIG. 6 is a flow chart illustrating an iris recognition method according to some embodiments of the present disclosure.

As illustrated in FIG. 6, in some embodiments, the iris recognition module 20 further includes an infrared light source 21. Performing the iris recognition by the iris recognition module 20 when determining that there is the face contour in the image in act S13 may include acts.

S131, light is filled by the infrared light source 21.

S132, an iris image is captured by the infrared camera 22.

S133, the iris image is processed to extract feature information.

S134, it is determined whether the feature information matches pre-stored iris feature information.

S135, when the feature information matches the pre-stored iris feature information, it is determined that the iris recognition is successful.

As illustrated in FIG. 2 again, in some embodiments, act S131 may be implemented by the infrared light source 21, act S132 may be implemented by the infrared camera 22, and act S133, act S134 and act S135 may be implemented by the iris recognition module 20.

That is, the infrared light source 21 is configured to fill light. The infrared camera 22 is configured to capture an iris image. The iris recognition module 22 is further configured to:

process the iris image to extract feature information;

determine whether the feature information matches pre-stored iris feature information; and when the feature information matches the pre-stored iris feature information, determine that the iris recognition is successful.

As illustrated in FIG. 3 again, in some embodiments, the one or programs 51 further include instructions for performing the following acts.

S131, light is filled by the infrared light source 21.

S132, an iris image is captured by the infrared camera 22.

S133, the iris image is processed to extract feature information.

S134, it is determined whether the feature information matches pre-stored iris feature information.

S135, when the feature information matches the pre-stored iris feature information, it is determined that the iris recognition is successful.

In detail, the infrared camera 22 may capture the iris image in an environment where the infrared light source 21 fills light. Subsequently, the iris image is processed to extract feature information. In detail, the iris is positioned first, in which the iris may be positioned by extracting an inner boundary and an outer boundary of the iris. The inner boundary is extracted by calculating a grayscale histogram of the entire iris image firstly. Since the grayscale histogram has two main peaks, the first peak corresponds to a range of grayscale concentration in the pupil region, and the second peak corresponds to a range of grayscale concentration in the iris region. Then, by selecting a binarization threshold on the right side of the first peak and binarizing the iris image, the pupil may be separated to extract the inner boundary. The outer boundary is extracted by the Hough transform method. Firstly, the iris image is edge-extracted using the Canny operator, and then the edge coefficient of the iris is determined by using the Hough transform that may detect an object with a specific shape to extract the outer boundary. The location of the ring-shaped iris may be determined after determining the boundaries of the inner and outer circles. Subsequently, normalization and image enhancement may be performed on the positioned iris. The normalization is to convert iris textures of different sizes into a fixed-size region by mapping (such as polarization coordinates), thereby eliminating influence of translation, rotation, and scaling on the iris recognition. The image enhancement is performed by local histogram equalization, that is, a point operation, to convert the positioned ring-shaped iris image into an image that has the same pixel output at each gray level, thereby improving low contrast of the normalized image due to non-uniform illumination. Subsequently, feature extraction and encoding are performed on the normalized and image-enhanced iris image. In detail, the feature extraction of the iris image may be performed using wavelet transform. The 2D Gabor function may form a set of self-similar wavelets through scaling, rotation, and translation. Multiplying and integrating the 2D Gabor function with the pixels of the iris image may generate a series of wavelet coefficients, thereby extracting the image textures, i.e., the feature information. Encoding refers to zero-cross coding on the wavelet coefficients to obtain a series of binary coded values. Finally, the feature information after the feature extraction and coding is compared with pre-stored iris feature information. In detail, the feature coding of the iris image is matched with the feature coding of the pre-stored iris feature information one by one to determine whether it is the same iris. Matching of the feature coding may use the Hamming distance matching algorithm:

$$HD = \frac{1}{L}\sum_{i=1}^{L} A_i \otimes B_i,$$

where $A_i$ represents the $i^{-th}$ code of the feature coding of the iris image, $B_i$ represents the $i^{-th}$ code of the feature coding of the pre-stored iris feature information, L represents a length of the feature coding. After an exclusive OR operation is performed on $A_i$ and $B_i$, the smaller the value of the obtained HD, the higher the degree of matching of the feature coding of the iris image with the feature coding of the pre-stored iris feature information. In this way, it may be determined whether the feature information and the pre-stored feature information match each other, and the iris recognition is considered as successful when matching.

Figure 7:
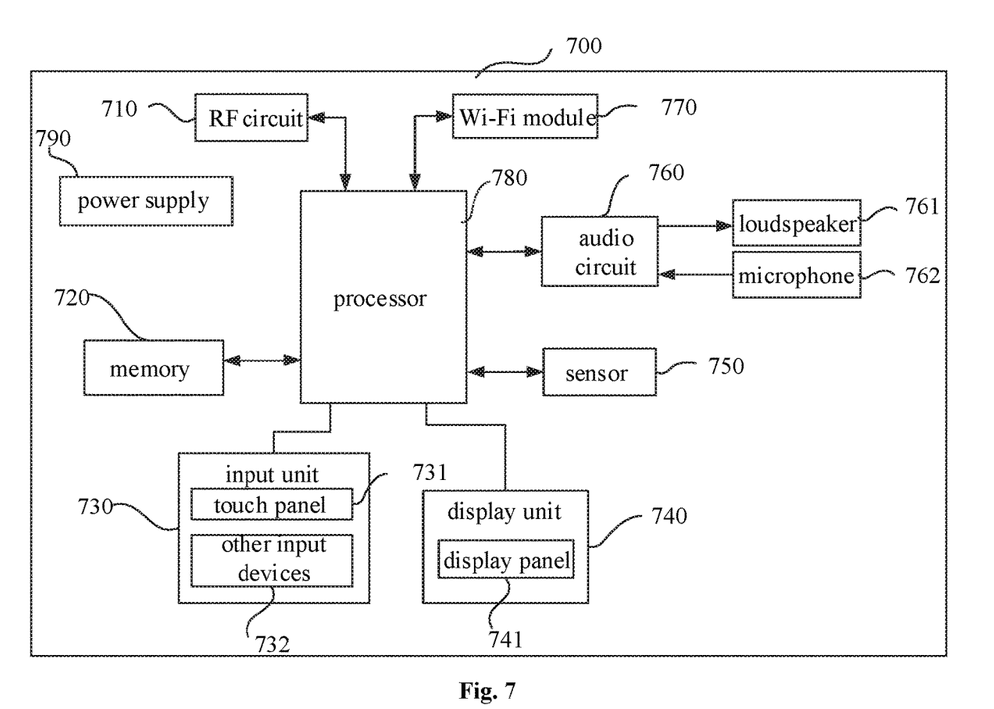
FIG. 7 is a schematic diagram of an internal structure of an electronic device according to some embodiments of the present disclosure.

FIG. 7 is a schematic diagram of an internal structure of an electronic device according to an embodiment of the present disclosure. With reference to FIG. 7, the electronic device 700 includes a radio frequency (RF) circuit 710, a memory 720, an input unit 730, a display unit 740, a sensor 750, an audio circuit 760, a wireless fidelity (Wi-Fi) module 770, a processor 780 and a power supply 790, and the like. It may be understood by those skilled in the art that the structures of the electronic device 700 illustrated in FIG. 7 do not limit the structures of the electronic device. The electronic device may include less or more components than those illustrated in FIG. 7 or combinations thereof, or have a different arrangement of components.

The RF circuit 710 may be configured to receive or transmit a signal during a process of transmitting or receiving a message or making a call. The RF circuit 710 may be configured to receive downlink data from a base station and to transmit the downlink data to the processor 780. Alternatively, the RF circuit 710 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 710 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 720 may be configured to store software programs or modules. The processor 780 is configured to execute various functional applications and data processes of the electronic device 700 by running the software programs and modules stored in the memory 720. The memory 720 may mainly include a program storage region and a data storage region. The program storage region may store an operation system, at least one function required applications (such as an application having a sound playing function, an application having an image playing function) and the like. The data storage region may store data produced by using the electronic device 700 (such as audio data, an address book) and the like. In addition, the memory 720 may include a high speed random access memory and may include a non-volatility memory, such as at least one disk memory, a flash memory, or other volatility solid state memory.

The input unit 730 may be configured to receive figure or character information inputted and generate a key signal input related to a user setup or function control of the electronic device 700. In detail, the input unit 730 may include a touch panel 731 and other input devices 732. The touch panel 731 (also called as touch screen) may be configured to gather touch operations near or on the touch panel 731 (such as an operation on the touch panel 731 or near the touch panel 731 of the user with a finger, a stylus or other suitable objects or attachments), and drive corresponding connected device according to a preset program. In an embodiment, the touch panel 731 may include a touch detection device and a touch controller. The touch detection device detects an orientation of the user's touch, detects a signal caused by the touch operation and sends the signal to the touch controller. The touch controller receives the touch information on the touch detection device, converts the touch information to touch point coordinates, and sends the touch point coordinates to the processor 780. Furthermore, the touch controller may receive and execute a command sent from the processor 780. The touch panel 731 may be implemented as resistance typed, capacitive typed, infrared typed and surface acoustic wave typed. In addition to the touch panel 731, the input unit 730 may further include other input devices 732. In detail, the other input devices 732 may include but without limitation to one or more of a physical keyboard, a functional key (such as a volume control key, a switch key and the like).

The display unit 740 may be configured to display information inputted by the user or information provided to the user or various menus of the electronic device 700. The display unit 740 may include a display panel 741. In an embodiment, the display panel 741 may be configured as a liquid crystal display (LCD), an organic light-emitting diode (OLED) and the like. In an embodiment, the touch panel 731 may cover the display panel 741. When the touch panel 731 detects the touch operation on the touch panel 731 or near the touch panel 731, the touch operation is transmitted to the processor 780 to determine a type of the touch event. Thereafter, the processor 780 provides a corresponding visual output on the display panel 741 according to the type of the touch event. Although the touch panel 731 and the display panel 741 are two separate components to realize an input and output function of the electronic device 700 illustrated in FIG. 7, in certain embodiments, the touch panel 731 and the display panel 741 may be integrated to realize the input and output function of the electronic device 700, The electronic device 700 may further include at least one sensor 750, such as a gyroscope, an optical sensor, a motion sensor and other sensors. In detail, the gyroscope is configured to collect a rotation angular velocity of the electronic device 700. The optical sensor may include a surrounding light sensor and a proximity sensor. The surrounding light sensor may adjust a brightness of the display panel 741 according to surrounding lights. The proximity sensor may close the display panel 741 and/or backlight when the electronic device 700 moves near ears of the user. The motion sensor may include an acceleration sensor, for measuring the acceleration value in various directions via the acceleration sensor, measuring a value and a direction of gravity when the electronic device 700 is static, and identifying a state of the electronic device 700 (such as landscape screen and portrait screen switching), jitter related functions (such as a pedometer, a knocking) and the like. Furthermore, the electronic device 700 may be configured with a barometer, a hygrometer, a thermometer, an infrared sensor and other sensors.

The audio circuit 760, a loudspeaker 761 and a microphone 762 may provide an audio interface between the user and the electronic device 700. The audio circuit 760 may transmit an electrical signal converted from the audio data received to the loudspeaker 761. The loudspeaker 761 converts the electrical signal to a sound signal and output the sound signal. In another aspect, the microphone 762 may convert gathered sound singles to electrical signals. The audio circuit 760 receives and converts the electrical signals to audio data and outputs the audio data to the processor 780 to be processed. The audio data processed by the processor 780 may be transmitted to another electronic device via the RF circuit 710 or may be stored in the memory 720 to be subsequently processed.

Wi-Fi is a short distance wireless communication technology. The electronic device 700 may help the user to receive or send an e-mail, search webpages, access to stream medium via the Wi-Fi module 770. The Wi-Fi module 770 provides a wireless broadband Internet access. Although the Wi-Fi module 770 is illustrated in FIG. 7, it may be understood that, the Wi-Fi module 770 is not necessary for the electronic device 700, thus it may be omitted according to demands.

The processor 780 is a control center of the electronic device 700, which utilizes various interfaces and wires to connect various parts of the electronic device 700. By running or executing the software program and/or modules stored in the memory 720, and by invoking data stored in the memory 720, the various functions and data processing functions may be executed, thus integrally monitoring the electronic device 700. In an embodiment, the processor 780 may include one or more processing units. In an embodiment, the processor 780 may be integrated with an application processor or a modem processor. The application processor mainly processes the operation system, a user interface and an application. The modem processor mainly processes wireless communication. It may be understood that, the above modem controller may be not integrated in the processor 780.

The electronic device 700 may further includes a power supply 790 (such as a battery) for providing powers to various parts of the electronic device. Alternatively, the power supply may be logically connected to a power management system and the processor 780, thereby managing a charging, discharging and power consumption via the power management system.

In an embodiment, the electronic device 700 may further include a camera, a Bluetooth module and the like.

In embodiments of the present disclosure, the processor 780 included in the electronic device may execute the computer programs stored in the memory to achieve the above method, which will be not repeated here.

The computer-readable storage medium according to embodiments of the present disclosure includes computer programs configured to combine with an electronic device 100 capable of photographing. The computer programs are configured to be executed by a processor 40 to perform the iris recognition method according to any one of the above embodiments of the present disclosure.

For example, the computer programs may be executed by the processor 40 to perform the iris recognition method described in the following acts.

S11, motion information of the electronic device 100 is detected by the motion sensor 30.

S12, when the motion information of the electronic device 100 satisfies a preset condition, an image of a user is captured by the infrared camera 22.

S13, when determining that there is a face contour in the image, iris recognition is performed by the iris recognition module 20.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine the different embodiments or examples described in this specification and features of different embodiments or examples without conflicting with each other.

Terms such as "first" and "second" are used herein for purposes of description and are not intended to indicate or imply relative importance or significance or imply the number of technical features. Furthermore, the feature defined by "first" or "second" may indicate or imply including at least one feature. In the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

Any process or method described in a flow chart or described herein in other ways may be understood to be a sequence table of executable instructions for achieving logical functions, which may be realized in any computer-readable medium for being used by the instruction execution system, device or apparatus (for example, the system based on the computer, the system including the processor or other systems capable of reading instructions from the instruction execution system, device or apparatus and executing the instructions) or being used in combination with the instruction execution system, device or apparatus. In the specification, "computer-readable medium" may be any device including, storing, communicating, broadcasting or transmitting programs for being used by the instruction execution system, device or apparatus or being used in combination with the instruction execution system, device or apparatus. Specific examples of the computer-readable medium (non-exhaustiveness list) include: electrical connection (electronic device) having one or one wires, portable computer disk box (magnetic device), random access memory (RAM), read only memory (ROM), electrically programmable read-only-memory (EPROM or flash memory), fiber device, and portable CD-ROM. In addition, the computer-readable medium may even to paper on which programs can be printed or other appropriate medium, this is because optical scanning may be performed on the paper or the other medium, and then edit, interpretation or any other appropriate way if necessary are performed to electrically obtain the programs, and then the programs are stored in the computer storage.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An iris recognition method, applied for an electronic device, wherein the electronic device comprises an iris recognition module and a motion sensor, the iris recognition module comprises an infrared camera, and the method comprises:

detecting motion information of the electronic device by the motion sensor;

when the motion information of the electronic device satisfies a preset condition, starting the infrared camera and capturing an image of a user by the infrared camera; and     when determining that there is a face contour in the image, performing iris recognition by the iris recognition module;

wherein, the iris recognition module further comprises an infrared light source, and performing the iris recognition by the iris recognition module when determining that there is the face contour in the image comprises:

filling light by the infrared light source;

capturing an iris image by the infrared camera;

positioning an iris by extracting an inner boundary of the iris using a grayscale histogram of the iris image and by extracting an outer boundary of the iris using Hough transform method;

processing the iris image based on the position of the iris to extract feature information;

determining whether the feature information matches pre-stored iris feature information; and     when the feature information matches the pre-stored iris feature information, determining that the iris recognition is successful.

2. The method according to claim 1, wherein the motion sensor comprises a gyroscope and/or an acceleration sensor.

3. The method according to claim 1, wherein the motion information comprises trajectory information, and detecting the motion information of the electronic device by the motion sensor comprises:

detecting the trajectory information of the electronic device by the motion sensor.

4. The method according to claim 3, wherein the preset condition is a preset motion trajectory,     wherein, the method further comprises:

obtaining a motion trajectory based on the trajectory information;

determining whether a difference between the motion trajectory and the preset motion trajectory is less than a preset value;

determining that the trajectory information of the electronic device satisfies the preset condition when the difference is less than the preset value.

5. The method according to claim 1, wherein the motion information comprises shake information, and detecting the motion information of the electronic device by the motion sensor comprises:

detecting the shake information of the electronic device by the motion sensor.

6. The method according to claim 5, wherein the preset condition is a preset number of shakes, wherein, the method further comprises:

determining whether a sudden acceleration change occurs based on the shake information;

counting a number of sudden acceleration changes when determining that the sudden acceleration change occurs;

determining whether the number of sudden acceleration changes during a time period is greater than the preset number of shakes; and     determining that the shake information of the electronic device satisfies the preset condition when the number of sudden acceleration changes during the time period is greater than the preset number of shakes.

7. An electronic device, comprising:

a motion sensor, configured to detect motion information of the electronic device;

an infrared camera, configured to be started when the motion information of the electronic device satisfies a preset condition, and to capture an image of a user; and     an iris recognition module, comprising the infrared camera and configured to, when it is determined that there is a face contour in the image, perform iris recognition;

wherein the iris recognition module further comprises an infrared light source;

the infrared light source is configured to fill light;

the infrared camera is further configured to capture an iris image; and     the iris recognition module is further configured to position an iris by extracting an inner boundary of the iris using a grayscale histogram of the iris image and by extracting an outer boundary of the iris using Hough transform method; process the iris image based on the position of the iris to extract feature information; determine whether the feature information matches pre-stored iris feature information; and when the feature information matches the pre-stored iris feature information, determine that the iris recognition is successful.

8. The electronic device according to claim 7, wherein the motion sensor comprises a gyroscope and/or an acceleration sensor.

9. The electronic device according to claim 7, wherein the motion information comprises trajectory information, and the motion sensor is configured to detect the trajectory information of the electronic device.

10. The electronic device according to claim 9, wherein the electronic device further comprises a processor, the preset condition is a preset motion trajectory, and the processor is further configured to:

obtain a motion trajectory based on the trajectory information;

determine whether a difference between the motion trajectory and the preset motion trajectory is less than a preset value;

determine that the trajectory information of the electronic device satisfies the preset condition when the difference is less than the preset value.

11. The electronic device according to claim 7, wherein the motion information comprises shake information, and the motion sensor is configured to detect the shake information of the electronic device.

12. The electronic device according to claim 11, wherein the electronic device further comprises a processor, the preset condition is a preset number of shakes, and the processor is further configured to:

determine whether a sudden acceleration change occurs based on the shake information;

count a number of sudden acceleration changes when determining that the sudden acceleration change occurs;

determine whether the number of sudden acceleration changes during a time period is greater than the preset number of shakes; and     determine that the shake information of the electronic device satisfies the preset condition when the number of sudden acceleration changes during the time period is greater than the preset number of shakes.

13. A non-transitory computer-readable storage medium, comprising computer programs configured to combine with an electronic device capable of photographing, wherein the electronic device comprises an iris recognition module and a motion sensor, the iris recognition module comprises an infrared camera, and the computer programs are configured to be executed by a processor to perform an iris recognition method, the method comprising:

detecting motion information of the electronic device by the motion sensor;

when the motion information of the electronic device satisfies a preset condition, starting the infrared camera and capturing an image of a user by the infrared camera; and when determining that there is a face contour in the image, performing iris recognition by the iris recognition module;

wherein the iris recognition module further comprises an infrared light source, and performing the iris recognition by the iris recognition module when determining that there is the face contour in the image comprises:

filling light by the infrared light source;

capturing an iris image by the infrared camera;

positioning an iris by extracting an inner boundary of the iris using a grayscale histogram of the iris image and by extracting an outer boundary of the iris using Hough transform method;

processing the iris image based on the position of the iris to extract feature information;

determining whether the feature information matches pre-stored iris feature information; and when the feature information matches the pre-stored iris feature information, determining that the iris recognition is successful.

14. The non-transitory computer-readable storage medium according to claim 13, the motion information comprises trajectory information, and detecting the motion information of the electronic device by the motion sensor comprises:

detecting the trajectory information of the electronic device by the motion sensor.

15. The non-transitory computer-readable storage medium according to claim 14, wherein the preset condition is a preset motion trajectory, and the method further comprises:

obtaining a motion trajectory based on the trajectory information;

determining whether a difference between the motion trajectory and the preset motion trajectory is less than a preset value;

determining that the trajectory information of the electronic device satisfies the preset condition when the difference is less than the preset value.

16. The non-transitory computer-readable storage medium according to claim 13, wherein the motion information comprises shake information, and detecting the motion information of the electronic device by the motion sensor comprises:

detecting the shake information of the electronic device by the motion sensor.

17. The non-transitory computer-readable storage medium according to claim 16, wherein the preset condition is a preset number of shakes, and the method further comprises:

determining whether a sudden acceleration change occurs based on the shake information;

counting a number of sudden acceleration changes when determining that the sudden acceleration change occurs;

determining whether the number of sudden acceleration changes during a time period is greater than the preset number of shakes; and determining that the shake information of the electronic device satisfies the preset condition when the number of sudden acceleration changes during the time period is greater than the preset number of shakes.

18. The method of claim 5, further comprising:

detecting acceleration data of the motion sensor at different times and recording the different times;

calculating a time difference between an adjacent first acceleration and second acceleration;

calculating absolute values of change of acceleration between the first acceleration and the second acceleration on an X, Y, Z axes of the electronic device;

determining an average value for a rate of the change of acceleration based on the time difference and the absolute values;

determining that a sudden acceleration change occurs when the average value is larger than a preset average threshold;

when the number of the sudden acceleration change is greater than a preset number of shakes, starting the infrared camera and capturing the image of the user by the infrared camera; and when determining that there is a face contour in the image, performing iris recognition by the iris recognition module.

19. The electronic device according to claim 11, further comprising a processor, wherein the motion sensor is configured to detect acceleration data of the motion sensor at different times and record the different times;

the processor is configured to calculate a time difference between an adjacent first acceleration and second acceleration, calculate absolute values of change of acceleration between the first acceleration and the second acceleration on an X, Y, Z axes of the electronic device (100); determine an average value for a rate of the change of acceleration based on the time difference and the absolute values; and determine that a sudden acceleration change occurs when the average value is larger than a preset average threshold;

the infrared camera is configured to be started when the number of the sudden acceleration change is greater than a preset number of shakes and to capture the image of the user; and an iris recognition module is configured to, when it is determined that there is the face contour in the image, perform the iris recognition.

20. The non-transitory computer-readable storage medium according to claim 16, wherein the method further comprises:

detecting acceleration data of the motion sensor at different times and recording the different times;

calculating a time difference between an adjacent first acceleration and second acceleration;

calculating absolute values of change of acceleration between the first acceleration and the second acceleration on an X, Y, Z axes of the electronic device;

determining an average value for a rate of the change of acceleration based on the time difference and the absolute values;

determining that a sudden acceleration change occurs when the average value is larger than a preset average threshold;

when the number of the sudden acceleration change is greater than a preset number of shakes, starting the infrared camera and capturing the image of the user by the infrared camera; and when determining that there is a face contour in the image, performing iris recognition by the iris recognition module.

* * * * *